United States Patent
Cicic et al.

(10) Patent No.: US 10,263,902 B2
(45) Date of Patent: *Apr. 16, 2019

(54) DEVICE AND SYSTEM FOR SELECTIVE FORWARDING

(71) Applicant: Media Network Services AS, Oslo (NO)

(72) Inventors: Tarik Cicic, Strømmen (NO); Haakon Bryhni, Oslo (NO)

(73) Assignee: MEDIA NETWORK SERVICES AS, Oslo (NO)

(*) Notice: Subject to any disclaimer, the term of this patent is extended or adjusted under 35 U.S.C. 154(b) by 0 days.

This patent is subject to a terminal disclaimer.

(21) Appl. No.: 15/248,325

(22) Filed: Aug. 26, 2016

(65) Prior Publication Data

US 2016/0366063 A1    Dec. 15, 2016

Related U.S. Application Data

(63) Continuation of application No. 12/828,835, filed on Jul. 1, 2010, now Pat. No. 9,455,924, which is a
(Continued)

(51) Int. Cl.
*H04L 12/66* (2006.01)
*H04L 12/851* (2013.01)
(Continued)

(52) U.S. Cl.
CPC .......... *H04L 47/2441* (2013.01); *H04L 12/66* (2013.01); *H04L 29/06* (2013.01);
(Continued)

(58) Field of Classification Search
None
See application file for complete search history.

(56) References Cited

U.S. PATENT DOCUMENTS

| 5,659,542 A | 8/1997 | Bell et al. |
| 5,732,078 A | 3/1998 | Arango |

(Continued)

FOREIGN PATENT DOCUMENTS

| EP | 1708408 A1 | 10/2006 |
| GB | 2485148 A | 5/2012 |

(Continued)

OTHER PUBLICATIONS

Blake, S. et al., "[RFC2475] An Architecture for Differentiated Services," IETF, Dec. 1998, The Internet Society, 33 pages.
(Continued)

*Primary Examiner* — Zewdu A Beyen
(74) *Attorney, Agent, or Firm* — Withrow & Terranova, P.L.L.C.; Vincent K. Gustafson

(57) ABSTRACT

A system and method of operating equipment and services to allow enhanced global transport of IP packets is presented. A global virtual network with guaranteed capacity is used to transport said IP packets. A number of application-specific forwarding devices are deployed to detect and forward selected traffic types to the virtual network. The application-specific selective forwarding devices can be implemented based on the IP packets analysis, or by deploying enhanced control protocols like SIP/H.323.

20 Claims, 5 Drawing Sheets

State-of-the-art VoIP deployment.

Related U.S. Application Data continuation-in-part of application No. PCT/NO2008/000469, filed on Dec. 29, 2008, and a continuation-in-part of application No. PCT/NO2008/000470, filed on Dec. 29, 2008.

(51) Int. Cl.

| | | |
|---|---|---|
| *H04L 29/06* | (2006.01) | |
| *H04L 12/751* | (2013.01) | |
| *H04L 12/725* | (2013.01) | |
| *H04L 12/26* | (2006.01) | |

(52) U.S. Cl.
CPC .............. *H04L 43/00* (2013.01); *H04L 45/02* (2013.01); *H04L 45/306* (2013.01)

(56) References Cited

U.S. PATENT DOCUMENTS

| | | | |
|---|---|---|---|
| 6,023,470 | A | 2/2000 | Lee et al. |
| 6,028,862 | A | 2/2000 | Russell et al. |
| 6,240,462 | B1 | 5/2001 | Agraharam et al. |
| 6,519,624 | B1 | 2/2003 | Gruber |
| 6,647,007 | B1 | 11/2003 | Zoernack |
| 6,965,592 | B2 | 11/2005 | Tinsley et al. |
| 7,904,586 | B1 | 3/2011 | Griffin et al. |
| 9,455,924 | B2 | 9/2016 | Cicic et al. |
| 2001/0043571 | A1* | 11/2001 | Jang .................... H04L 12/1813 370/260 |
| 2002/0009060 | A1 | 1/2002 | Gross |
| 2002/0016837 | A1 | 2/2002 | Naudus |
| 2002/0152325 | A1 | 10/2002 | Elgebaly et al. |
| 2002/0191602 | A1 | 12/2002 | Woodring et al. |
| 2003/0028671 | A1 | 2/2003 | Mehta et al. |
| 2003/0110305 | A1 | 6/2003 | Saxena |
| 2003/0117954 | A1 | 6/2003 | De Neve et al. |
| 2003/0118036 | A1 | 6/2003 | Gibson et al. |
| 2004/0054810 | A1 | 3/2004 | Furukawa et al. |
| 2004/0208122 | A1 | 10/2004 | McDysan |
| 2006/0262784 | A1 | 11/2006 | Cheethirala et al. |
| 2006/0268701 | A1 | 11/2006 | Clark |
| 2007/0110084 | A1* | 5/2007 | Bennett ................ H04W 40/36 370/401 |
| 2007/0124489 | A1 | 5/2007 | Swander et al. |
| 2007/0220563 | A1 | 9/2007 | Wu |
| 2007/0263597 | A1 | 11/2007 | Morinaga et al. |
| 2007/0276958 | A1 | 11/2007 | Curtis et al. |
| 2008/0043627 | A1 | 2/2008 | Singh et al. |
| 2009/0109893 | A1 | 4/2009 | Gopal |
| 2009/0222570 | A1 | 9/2009 | Toutain et al. |
| 2010/0325309 | A1 | 12/2010 | Cicic et al. |

FOREIGN PATENT DOCUMENTS

| | | |
|---|---|---|
| WO | 0199344 A2 | 12/2001 |
| WO | 2006043139 A1 | 4/2006 |
| WO | 2007011927 A2 | 1/2007 |

OTHER PUBLICATIONS

Braden, R. et al., "[RFC1633] Integrated Services in the Internet Architecture: an Overview," IETF, Jun. 2, 1994, Network Working Group, 30 pages.

Cicic, Tarik et al., "Multicast-Unicast Reflector", Proc. Norsk Informatik konferanse, Kristiansand, Norway, Nov. 1998, pp. 103-114.

Cicic, Tarik et al., "Unicast Extensions to IP Multicast," In proceedings of Protocols for Multimedia Communications (PROMS) conference, 2000, pp. 60-69.

Feamster, Nick et al., "How to Lease the Internet in Your Spare Time," ACM SIGCOMM Computer Communications Review journal, Jan. 2007, 6 pages.

Jen, D. et al., "APT: A Practical Transit Mapping Service," Internet-Draft, Network Working Group, Jul. 2, 2007, The IETF Trust, 23 pages.

Jiang, Yu et al., "Techniques for Determining the Geographic Location of IP Addresses in ISP Topology Measurement," Journal of Computer Science & Technology, vol. 20, No. 5, Kluwer Academic Publishers, Sep. 2005, pp. 689-701.

Oliveira, Ricardo et al., "Geographically Informed Inter-Domain Routing," Presented at IEEE International Conference on Network Protocols, Oct. 16-19, 2007, Beijing, China, IEEE, pp. 103-112.

Rosen, E. et al., "[RFC4364] BGP/MPLS IP Virtual Private Networks (VPNs)," IETF, The Internet Society, Feb. 2006, 42 pages.

Rosenberg, J. et al., "[RFC 3489], STUN—Simple Traversal of User Datagram Protocol (UDP) Through Network Address Translators (NATs)", Mar. 2003, The Internet Society, 42 pages.

Rosenberg, J.,"[ICE] Interactive Connectivity Establishment (ICE): A Protocol for Network Address Translator (NAT) Traversal for Offer/Answer Protocols," Internet-Draft, Network Working Group, Jun. 12, 2007, The IETF Trust, 200 pages.

Rosenberg, J. et al., "[TURN] Traversal Using Relays around NAT (TURN) : Relay Extensions to Session Traversal Utilities for NAT (STUN)," Internet draft, Jan. 22, 2008, The IETF Trust, 39 pages.

International Search Report (Form PCT/ISA/210) for International Patent Application No. PCT/GB2013/050040, dated Apr. 19, 2013, 4 pages.

Non-final Office Action for U.S. Appl. No. 12/828,835, dated Oct. 4, 2012, 13 pages.

Final Office Action for U.S. Appl. No. 12/828,835, dated May 7, 2013, 12 pages.

Advisory Action and Applicant-Initiated Interview Summary for U.S. Appl. No. 12/828,835, dated Sep. 9, 2013, 5 pages.

Non-final Office Action for U.S. Appl. No. 12/828,835, dated Feb. 13, 2014, 14 pages.

Non-Final Office Action for U.S. Appl. No. 12/828,835 dated Sep. 25, 2015, 9 pages.

Notice of Allowance and Examiner-Initiated Interview Summary for U.S. Appl. No. 12/828,835, dated May 24, 2016, 9 pages.

Corrected Notice of Allowability for U.S. Appl. No. 12/828,835, dated Jun. 14, 2016, 5 pages.

* cited by examiner

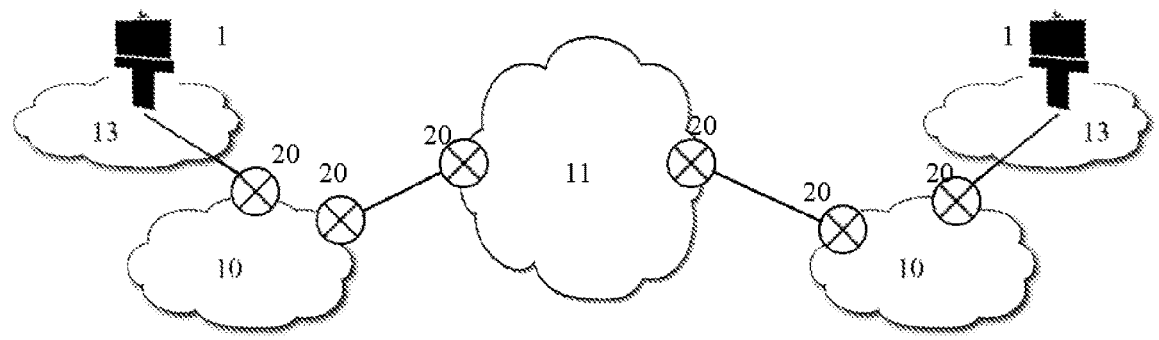
Figure 1: Internet communication model.
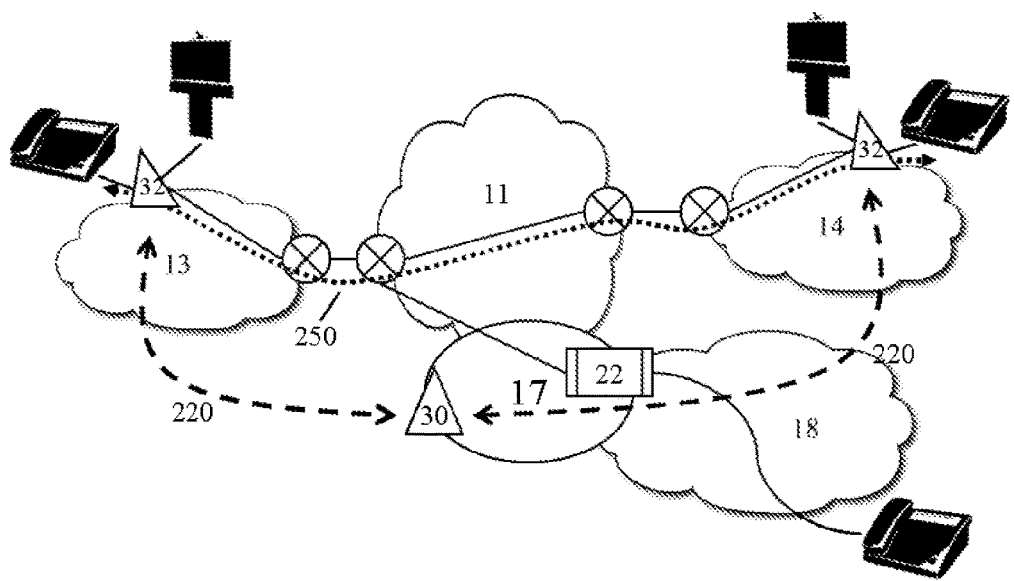
Figure 2: State-of-the-art VoIP deployment.

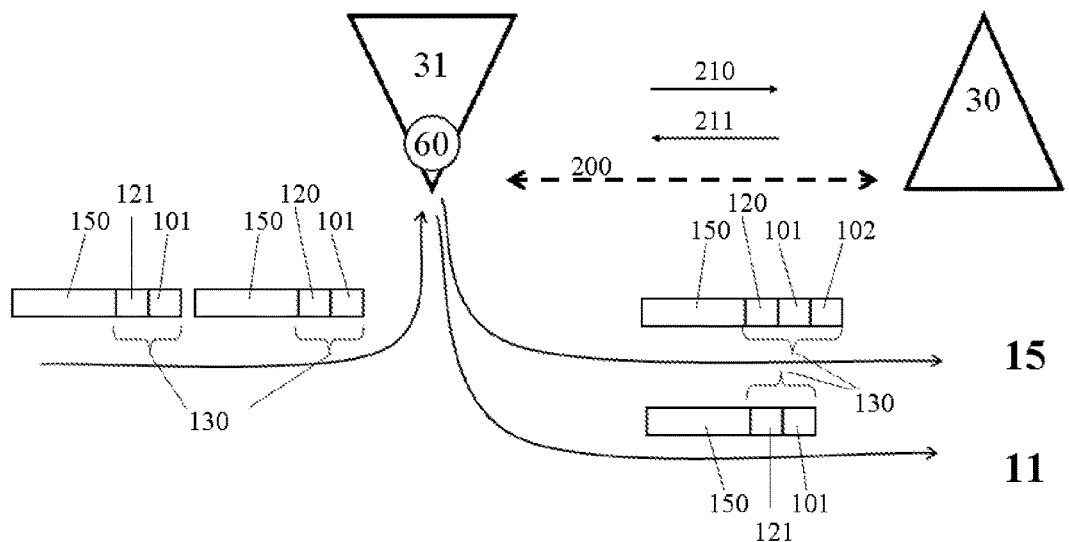
Figure 3: Application-specific forwarding device controlled by a control server.
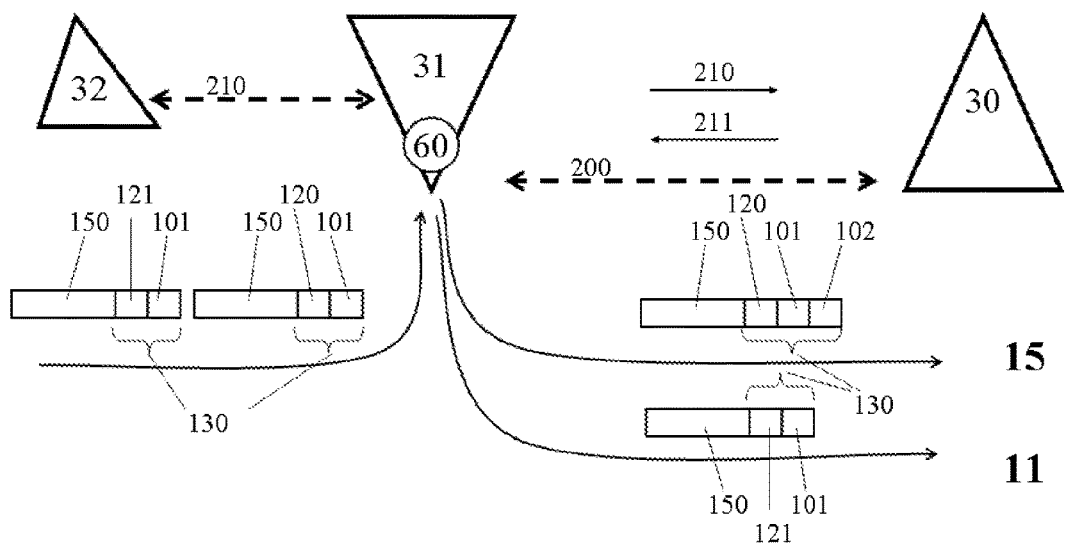
Figure 4: Application-specific forwarding device based on the endpoint control system.

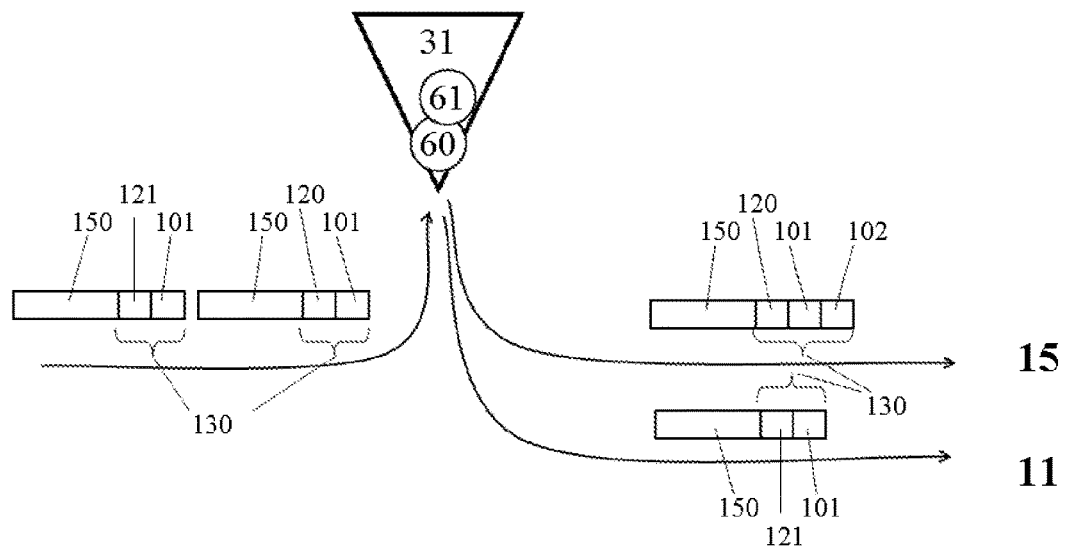
Figure 5: Application-specific forwarding device embodiment with data-driven operation.
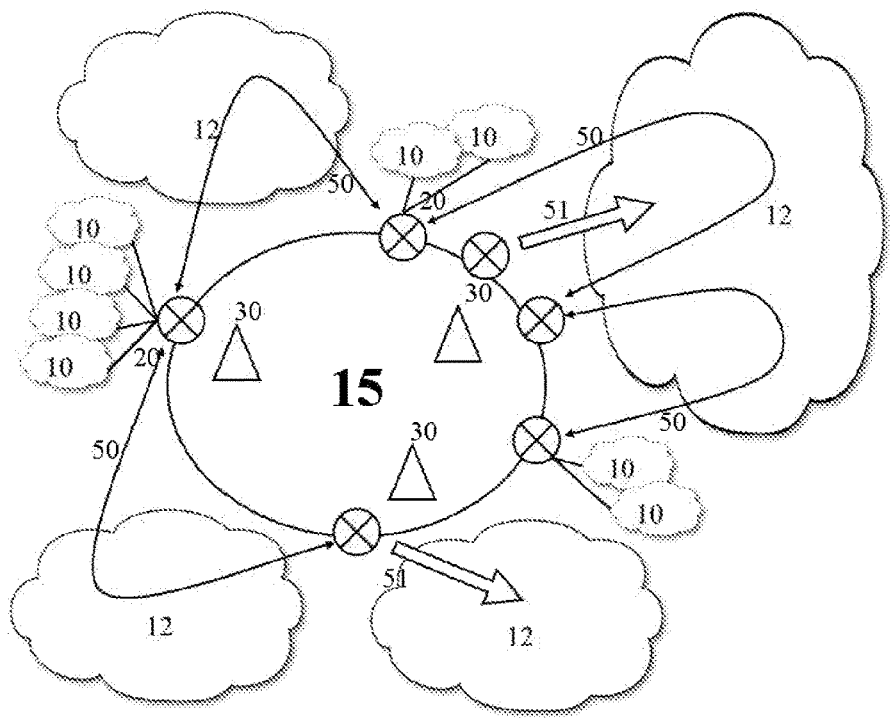
Figure 6: Dedicated transport network architecture.

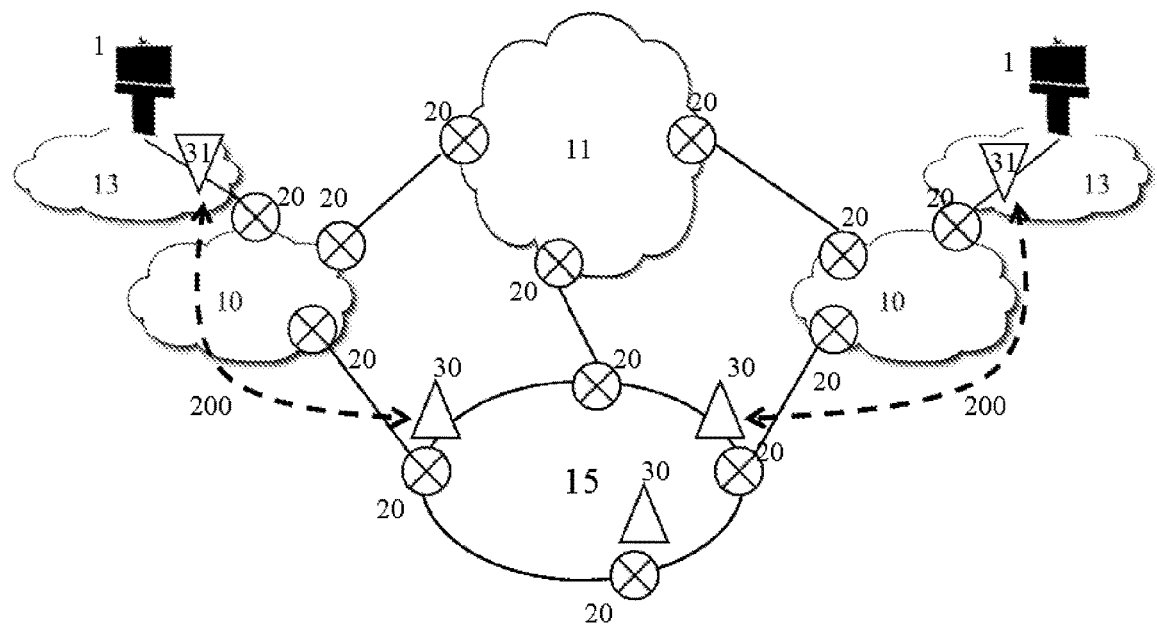
Figure 7: System embodiment 1.
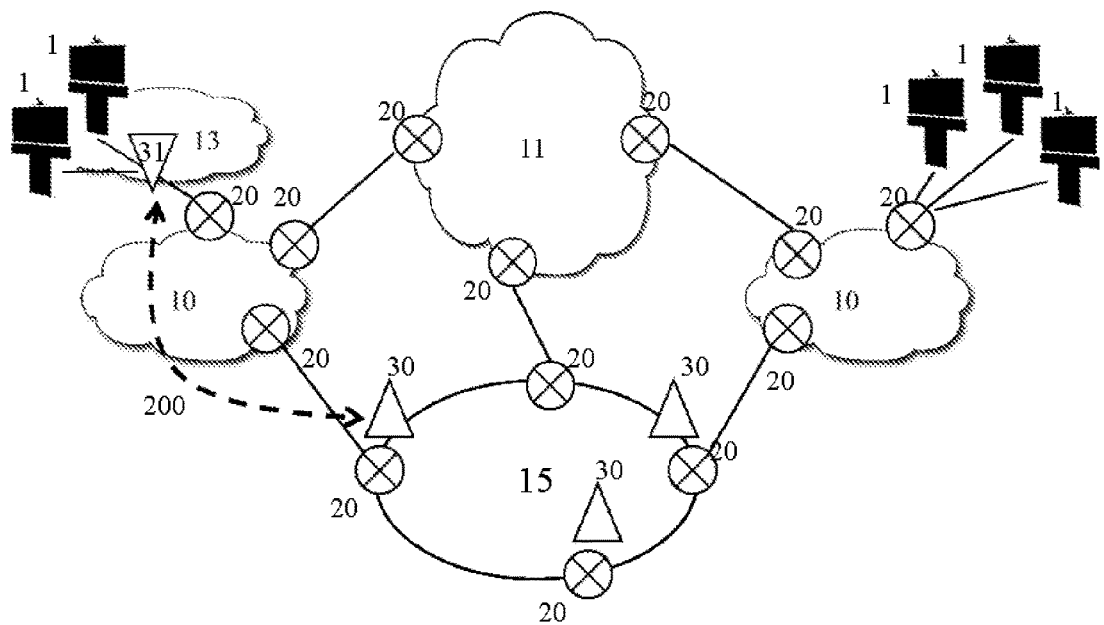
Figure 8: System embodiment 1 with multiple endpoints per local network.

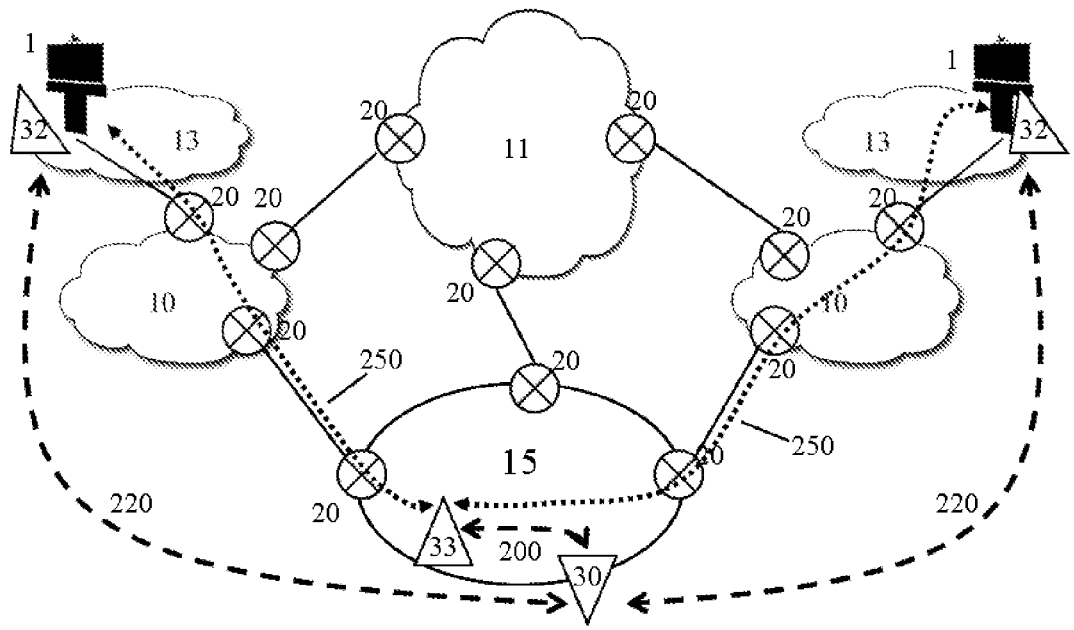
Figure 9: System embodiment 2.
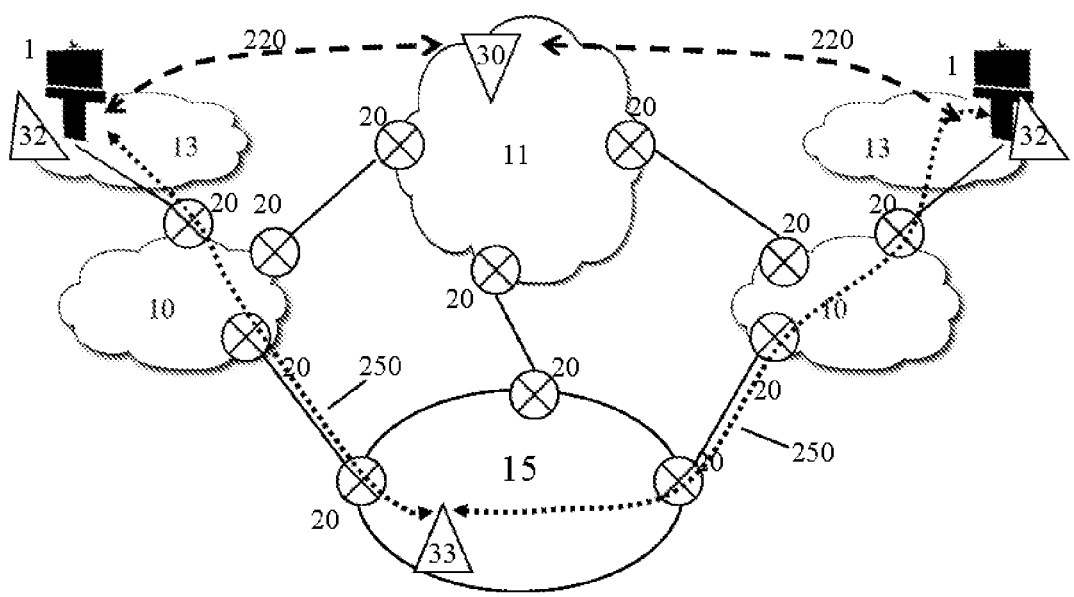
Figure 10: System embodiment 3.

DEVICE AND SYSTEM FOR SELECTIVE FORWARDING

CROSS-REFERENCE TO RELATED APPLICATIONS

This is a continuation under 35 U.S.C. § 120 of U.S. patent application Ser. No. 12/828,835 filed Jul. 1, 2010, now issued as U.S. Pat. No. 9,455,924, which is a continuation-in-part under 35 U.S.C. § 120 of International Patent Application No. PCT/NO08/000469 filed Dec. 29, 2008, and a continuation-in-part under 35 U.S.C. § 120 of International Patent Application No. PCT/NO08/000470 filed Dec. 29, 2008, and further claims priority under 35 U.S.C. § 119 of each of Norwegian Patent Application No. 20080028 filed Jan. 2, 2008, and Norwegian Patent Application No. 20080027 filed Jan. 2, 2008. The disclosures of all of the foregoing applications are hereby incorporated herein by reference in their respective entireties, for all purposes.

BACKGROUND

In the use model that dominates the Internet today, communication equipment (1) that produces data streams is situated at the ends or edges of the network. The data are sent from the source endpoint to the destination endpoint using the network system. The network system comprises local networks on the source and destination side (13), one or more local Internet Service Providers (ISP, 10) and one or more transport networks (11) as shown in FIG. 1.

Local networks (13) implement secure communication environments typically with private addresses and a firewall toward the rest of the Internet. Local Internet service provider networks (10) aggregate a number of local networks and use the transport providers (11) to reach each other.

Data packets enter the network from the end systems typically using a socket interface. In this model, the socket is identified by the pentuple of (source address, destination address, source port number, destination port number, protocol type). The packets comprise two parts: a header and a payload. The header provides control information, while the payload contains higher-layer (e.g., application-level) data. The header identifies said pentuple.

The data are forwarded between the forwarding devices (20) hop-by-hop using the information in the packet header. Although additional functionality can be implemented in a network, only this hop-by-hop forwarding toward the destination is implemented universally in the Internet.

Therefore, the network functionality an endpoint and its associated local network components typically implement is related to network addressing, including
 a) Resolving of symbolic names to network addresses; and
 b) Support for traversal of Network Address Translator (NAT) and firewall traversal.

This simple interface does not allow the endpoint to select the end-to-end network path. Only the destination can be selected, and the network itself chooses the path. Typically, the packet will have to traverse multiple administrative authorities on its path.

The Internet provides so-called best-effort service to its users. This means the packets are transported from node to node toward their destination. They can be temporarily stored in the transit nodes awaiting available network capacity to continue the journey (buffering). The nodes are free to discard any packet; this would typically happen if a node receives more packets than it can forward in the moment and its buffering capacity is exceeded. No notification is given to the sender of the packet.

Many applications are interactive or bandwidth-demanding and have special network requirements such as low latency or low packet loss. These applications include among others gaming, business information feeds and multimedia communications. The traditional Internet model is insufficient for these applications. Advanced endpoint equipment may experience reduced quality due to congestion and packet loss.

Remedies that can improve the network quality and availability include establishing private wide area networks, both physical and virtual. Large enterprises may rent or deploy network capacity to connect their locations within the enterprise, but with a significant cost. Furthermore, one can influence the packet path using overlay or peer-to-peer architectures. Overlays and peer-to-peer networks cannot improve the network quality unless the network resources are provided to them with capacity guarantees, which is typically not the case.

Recently, some Internet Service Providers (ISPs) have extended their network access and Virtual Private Networks (VPN) services by offering new network service models.

One model is to provide the infrastructure for temporary data storage (caching) to enhance large-scale one-to-many data streaming. This model conserves bandwidth, but it assumes delay-tolerance and is not suitable for interactive, real-time communications.

Another network service model is to provide infrastructure with guaranteed bandwidth to customers with geographically diverse office locations together with associated private network maintenance services. This service is different from VPNs in that there can be given bandwidth and latency guarantees to the traffic, and the customer need not have maintenance personnel employed. The model is however limited to the locations where the provider has physical infrastructure available, and cannot be extended to arbitrary communication peers.

Some providers build their business model on extensive Border Gateway Protocol (BGP) peering with locally present ISPs, enhancing the performance of their hosting services. This method improves the network service quality only locally.

Finally, some providers rent network capacity or deploy it themselves where needed and provide end-to-end guaranteed bandwidth service. This approach provides excellent network infrastructure, but is coarse and expensive and therefore reserved only to the most well-funded enterprise customers. Communication with arbitrary peers is not possible.

Quality of Service in the Internet

Recognizing the shortcomings of the best effort Internet service, the research community has proposed Quality of Service (QoS) models for the Internet.

In IntServ [RFC1633], network resources can be reserved end-to-end using a special signaling protocol called RSVP. The resources are reserved per flow, along the standard routing path. Such per-flow reservations scale poorly in the Internet where millions of flows are running concurrently, and are seldom deployed in practice.

DiffServ [RFC2475] is a QoS framework for differentiation between different traffic classes. DiffServ scales well and can be used to provide a better service to a certain segments of the network traffic like VoIP. However, DiffServ provides no hard QoS guarantees, only prioritizing a given traffic type in front of another.

Both Internet QoS service frameworks have a serious shortcoming in that they need service agreements between the administrative domains. Furthermore, the local ISP would have to guarantee the service level to the user, without having full control of how the data is sent to the destination. This has been proved to be difficult in practice, and IntServ and DiffServ remain used largely in private networks.

Network Virtualization

Network virtualization has recently been proposed as a means of deploying global network services. In a recent architecture proposal called CABO ("Concurrent Architectures are Better than One" [CABO]), virtual network links connect virtual routers to deploy a range of concurrent internets. The virtual links are implemented using any of many available technologies including MPLS and IP tunneling. Virtual routers are running as processes on real routing equipment owned and managed by the infrastructure providers. The virtual routers have their integral resources such as output queues and schedulers. There is also a possibility to connect virtual links based on infrastructure owned by different providers using the virtual routers.

The distinction between the infrastructure providers and the network service providers is a novel concept in CABO and facilitates implementation of custom global network services. These could include secure networks, QoS networks, and networks with different addressing and routing schemes providing yet unknown services. CABO also advocates deployment of a signaling system for dynamic establishment of virtual network topologies. However, current business and security models in the Internet do not encourage deployment of CABO since the network operators do not accept third-party access to their critical infrastructure.

Real-Time Conferencing

Real-time multimedia conferencing has gained substantial popularity recently, particularly in audio (telephony/Voice over IP) applications. Typically, a control system based on the Session Initiation Protocol, H.323 or a proprietary protocol (e.g. Skype) establishes a connection between the endpoints. The endpoints encode the media (audio, video, text for short messages, etc.) and send them as IP packets.

FIG. 2 shows a typical state of the art deployment for VoIP and/or video conferencing using SIP or H.323. The VoIP/conferencing operator typically operates a control infrastructure (17) with at least a control server (30) and optionally media gateways (22) to facilitate audio communication from IP-based networks (11,13,14) to PSTN (18). The communication is initiated in a terminal connected to a terminal adapter (32). Many terminals include the terminal adapter capabilities inside the terminal, constituting a multimedia terminal, often called a "softphone" if implemented inside a mobile phone/computer. The call is signaled from the terminal to the control server (30) using a control protocol (220). This control server is typically a SIP or H.323 proxy, which communicate with the remote terminal and establish a connection. The terminals are instructed to use an IP/port address combination for the media communication. The media stream (250) takes the default path through the IP network (11,13,14) to the destination terminal, and voice or video communication can begin. If the called party is a terminal on the PSTN network, the control server (30) will direct the call to a suitable media gateway (22) and complete the call over regular PSTN.

NAT and Firewall Traversal

Network Address Translation (NAT) devices perform translation of IP addresses between networks. For example, internal IP addresses on a user network (13) can have a mapping in the public Internet address space. In each packet leaving the local network (13) the IP header has to be modified by swapping the local addresses with the global ones. There are 4 basic types of NAT [STUN]:
   a. Full Cone (not frequently used due to security issues)
   Restricted Cone (the NAT IP mapping is only valid with outgoing traffic to the destination)
   Port Restricted Cone (same as Restricted Cone, but with IP and port mapping)
   b. Symmetric (different mapping for different destination addresses)

Firewalls are used to enforce security in the local network. They typically close a majority of network ports and discard packets addressed to these ports.

NAT and firewalls are widely used. Any device operating in the Internet today must be capable of handling them. There are many practical solutions to the NAT and firewall problem, among these:
   Universal Plug and Play (security issues by client control of firewall pinholes, and does not work with cascading NATs).
   STUN [STUN], which is a client-server system where the server answers the clients query by embedding the perceived global address of the client in the payload of its reply.
   TURN server [TURN], which is a STUN server with additional functionality to forward data packets to a given global IP destination.
   Application Level Gateway (ITU standard H.460.17/18/19) for use with the H.323 standards.

Note that the present invention does not specify any particular of the NAT and firewall traversal solutions, and is intended to work with all of the above.

BRIEF DESCRIPTION OF THE DRAWINGS

FIG. 1 is a schematic depicting a network system comprising local networks on the source and destination sides, one or more local Internet Service Providers, and one or more transport networks.

FIG. 2 is a schematic of a deployment for VOIP and/or video conferencing using SIP or H.323.

FIG. 3 is a schematic showing an application-specific forwarding device controlled by a control server according to one embodiment of the present invention.

FIG. 4 is a schematic showing an application-specific forwarding device based on the endpoint control system according to one embodiment of the present invention.

FIG. 5 is a schematic showing an application-specific forwarding device with data-driven operation according to one embodiment of the present invention.

FIG. 6 is a schematic showing dedicated transport network architecture according to one embodiment of the present invention.

FIG. 7 is a schematic showing a system according to one embodiment of the present invention.

FIG. 8 is a schematic showing a system with multiple endpoints per local network according to one embodiment of the present invention.

FIG. 9 is a schematic showing a system according to another embodiment of the present invention.

FIG. 10 is a schematic showing a system according to another embodiment of the present invention.

DESCRIPTION OF THE INVENTION

The present invention enables the automatic redirection of traffic to a dedicated transport network by means of an application-specific selective data packet forwarding device. The device can be integrated in the communication terminal, placed in the local network (CPE), in equipment in an enterprise DMZ or using a public server. The device handles data packets, typically in RTP format, and must be present in the media data path between the communicating peers.

Features of embodiments of the invention include that

It provides a targeted service for a specific data type (e.g., video, audio, game short messages, stock info)

It redirects the selected traffic to a dedicated transport network.

It integrates AAA (Accounting, Authentication, Authorization) as part of the system, in order to provide commercial services.

The application-specific selective packet-forwarding device integrates with standard IP networks and standard communication protocols like SIP and H.323.

Data packet redirection can be either control driven or data driven:

Control-driven where a control protocol such as SIP, H.323 or another control protocol controls the application-specific forwarding device and instructs it which packets to redirect to the dedicated transport network and which packets to forward over the shared Internet.

Data-driven where the application-specific forwarding device analyzes data packets and decides which packets to redirect to the dedicated transport network and which packets to forward over the shared Internet.

Global IP addresses are mapped to the dedicated network PoPs and IP addresses. This way the dedicated network can hold the packets for as long as it takes to forward them to the PoP nearest to their destination.

Application-Specific Packet-Forwarding Device

In one set of embodiments, application-specific packet forwarding devices (31) distinguish between the traffic that should be forwarded over the dedicated transport network (15) and the traffic that should be forwarded over the regular, shared Internet (11). The device comprises a packet filter (60) that classifies the data packets into at least two classes; one for the regular, shared Internet (11) and one for the dedicated transport network (15). The packet header (130) can be changed to reflect the intended transport. The packet payload (150) can be transported unaltered.

Latency or bandwidth sensitive traffic is thus redirected to a dedicated network (15) in order to provide certain QoS guarantees to the user of the network service. Said dedicated network is a transport network comprising retransmission devices (20) at multiple points of presence (PoPs), internally connected by guaranteed bandwidth channels (50), owned or rented from transport providers (12). The network is connected to multiple ISPs (10).

The traffic is redirected to the said dedicated transport network (15) using an application-specific selective forwarding device (31). Said device forwards selected traffic to any destination address to the address of a retransmission device (20) in the transport network. The traffic can be selected by analyzing the packet header (130) or packet content (150), or by interaction with a centralized or distributed server (30). To forward packets to the re-transmission device, said application-specific selective forwarding device can use many mechanisms, including IP tunnels and transport-level proxy mechanisms.

The packets selected for forwarding over the dedicated transport network (15) are addressed (102) to a retransmission device (20) within the dedicated network (15). The address of said re-transmission device (20) is determined by a mapping between an address space and the addresses of the re-transmission devices within the transport network. Said address space can be the IP address space, or the PSTN E.164 address space, or another address space that contains the network addresses of the call source and destination. Said re-transmission device (20) can be an IP router, or a transport relay (33) operating as a SIP or H.323 media proxy.

Said mapping can be implemented in several ways. It can be based on BGP routing information collected in the transport network from the connected ISPs. It can be based on measurements such as the current network load in the transport network. It can be based on the network distance, i.e., which re-transmission device is closest to the destination address, or which re-transmission device is closest to the source address.

There are two possible operation modes for the application-specific packet-forwarding device:

a. 1) control protocol integration
b. 2) data-driven operation.

Device Embodiment 1—Control Protocol Integration

In this embodiment, the control system establishes the session using e.g. SIP as shown in FIG. 3. It then uses a control interface to instruct the application-specific forwarding device (31) which packets should be forwarded to the dedicated transport network (15) and which need not.

The communication between the control server (30) and the application-specific forwarding device (31) can be organized as a query-response protocol (200). The device (31) can ask the server (30) whether the packet with header field combination (101, 120) should be transported using the dedicated network or not. The server (30) can answer with the re-transmission device (20) or transport relay (33) address (102).

Packets sent over the dedicated transport network (15) are encapsulated to a given address (102) within the dedicated network (15). There, they are de-capsulated and forwarded to their destination (101).

The selective forwarding device (31) learns the mapping between the global addresses (101) and the local addresses (102) from the control servers (30) using a query-reply protocol (200). The device (31) can ask which address in the dedicated transport network (15) should be used to send data to destination (101) using message (210). The answer is provided in the message (211).

Alternatively the endpoint control system (32) can control the application-specific forwarding device based on the user configuration data or a management system data using a specialized protocol (210) as shown in FIG. 4.

Device Embodiment 2—Data Driven Operation

In this embodiment, shown in FIG. 5, the application-specific forwarding device is in the data path and it monitors all IP data packets it forwards using a packet analyzer (61).

In the packet filter (60) it can select the packets that should be transported over the dedicated network (15) using header analysis or it quantifies the streams by associating the packets to the quintuple of (source address, destination address, source port, application port, protocol), possibly using wildcards on one or more fields, and forwards long-lasting or voluminous or otherwise selected streams over the dedicated network (15).

System Description

The system relies on a global dedicated transport network (15) as shown in FIG. 6, with the following properties:
  The network has multiple Points of Presence (PoP), located in vicinity of the endpoints operated by the service users.
  The PoPs are connected using virtual or real network lines with guaranteed bandwidth (50) leased from the transport providers (12).
  Access to the network is strictly controlled and typically allowed to the paying customers only.

System Embodiment 1

The first embodiment comprises a dedicated transport network (15), an application-specific forwarding device (31) and compliant re-transmission devices (20), as shown in FIG. 7.

The dedicated transport network (15) comprises points of presence (PoP) that are located close to the local ISPs (10). The PoPs are interconnected using physical or virtual links (50) with guaranteed bandwidth.

This embodiment relies on an application-specific forwarding device (31) that selects relevant traffic from the local network (13) and forwards this traffic onto a dedicated transport network (15) via the standard ISP used by the customer (10). The forwarding can be done using IP tunneling or a proxy operation using SIP or H.323. The retransmission devices (20) can be implemented as IP routers or as SIP/H.323 media proxies.

Using this configuration, all unrelated traffic such as email and file transfer will go over the default IP route (11), while latency and bandwidth-sensitive traffic will be redirected to a dedicated transport network (15) with sufficient capacity as shown in FIG. 6.

The redirection can also be applied for signaling traffic, but the signaling can also use the regular IP route since it is not latency and bandwidth sensitive.

Optional control servers (30) may communicate with the application-specific forwarding device to assist in determination of the route selection. Additionally, they can be used for admission control, AAA and directory services.

In addition, each local network can have multiple endpoints, as shown in FIG. 8. Multiple endpoints can be served by a concentrator typically located in the enterprise DMZ.

The architecture supports multicast. Multi-party conferences can be arranged by unicast-multicast reflectors [REFLECT] deployed in (20) and native multicast deployed in (15).

System Embodiment 2

In this embodiment shown in FIG. 9, the control server (30) is located in the public IP network, typically close to the dedicated transport network. One or more transport relays (33) are placed centrally in the dedicated transport network and can serve many users.

In this embodiment, the SIP/H.323 endpoint control system (32) in the terminals (1) must be configured to always contact the control server (30) as outbound signaling proxy. Signaling path is indicated between the terminals and the proxy (220). The control server maintains a mapping in the transport relay (33) using a control protocol (200).

After initial signaling between the endpoint control system (32) and the control server (30), the terminal is instructed to send the media stream (250) over the dedicated transport network (15) using the transport relay (33) as outbound media proxy.

The control server rewrites source and destination IP addresses/ports as part of the media redirection, to ensure that a packet redirected to the media proxy will be forwarded on to the original destination.

System Embodiment 3

Embodiment 3 as shown in FIG. 10 is similar to embodiment 2, the difference being that the control server (30) does not control the transport relay (33) directly. Instead, a modified Interactive Connectivity Establishment [ICE] procedure is used to instruct the transport relay (33) where to send the packets.

In this embodiment, the functionality of the transport relay (33) is similar to that of a TURN server [TURN]. The caller endpoint control system (32) is configured to use the transport relay (33) as the outbound media proxy. Thus, it always directs media to the dedicated network. The modified Interactive Connectivity Establishment [ICE] procedure is used to avoid sending data between collocated endpoint via the dedicated transport network (15). This procedure includes two steps:
  a) The caller endpoint verifies whether the called endpoint has an IP address in the same network segment and that the called endpoint can be contacted. If confirmative, no dedicated network (15) is used.
  b) Otherwise, the transport relay (33) is used.

When the transport relay (33) is used to transfer the data over the dedicated network (15), the NAT traversal is implicitly solved using the TURN technology.

REFERENCES

[CABO] Nick Feamster, Lixin Gao and Jennifer Rexford: "How to lease Internet in your spare time", ACM SIGCOMM Computer Communications Review journal, pages 61-64, January 2007.

[ICE] Rosenberg, J., "Interactive Connectivity Establishment (ICE): A Protocol for Network Address Translator (NAT) Traversal for Offer/Answer Protocols", IETF draft-ietf-mmusic-ice-16 (work in progress), June 2007.

[REFLECT] Tarik Cicic, Haakon Bryhni, Steinar Sørlie: "Multicast-Unicast Reflector", In proceedings of Protocols for Multimedia Communications (PROMS) conference, pages 60-69, Krakow, Poland, 2000.

[RFC1633] R. Braden, D. Clark, S. Shenker: "Integrated Services in the Internet Architecture: an Overview", IETF, June 1994.

[RFC2475] S. Blake, D. Black, M. Carlson, E. Davies, Z. Wang, W. Weiss "An Architecture for Differentiated Services", IETF, December 1998.

[RFC4364] E. Rosen and Y. Rekhter: "BGP/MPLS IP Virtual Private Networks (VPNs)", IETF, February 2006.

[STUN] Rosenberg, J., Weinberger, J., Huitema, C. and R. Mahy, "STUN—Simple Traversal of User Datagram Protocol (UDP) Through Network Address Translators (NATs)", RFC 3489, March 2003.

[TURN] J. Rosenborg, R. Mahy, C. Huitema: "Traversal Using Relays around NAT (TURN): Relay Extensions to Session Traversal Utilities for NAT (STUN)", IETF draft-ietf-behave-turn-06 (work in progress), 2007.

The invention claimed is:

1. A data transport system, comprising:
a first Internet Service Provider (ISP) network;
a second ISP network;
a private transport network, comprising multiple points of presence, connected by guaranteed bandwidth channels, wherein the private transport network is configured for transporting data between the first ISP network and the second ISP network;
a transport relay in the private transport network;
a control server configured to provide admission control to the private transport network by preventing unauthorized parties from accessing the private transport network;
a first data terminal, connected to the first ISP network; and
a second data terminal, connected to the second ISP network;
wherein the first data terminal is configured to send latency-sensitive data to the second data terminal by:
communicating with the control server to gain admission for the latency-sensitive data onto the private transport network; and
addressing the latency-sensitive data to the transport relay in the private transport network, so as to cause the latency-sensitive data (i) to travel from the first data terminal to the private transport network via the first ISP network, and then (ii) when admitted by the control server, to travel through the private transport network, via the transport relay, over a guaranteed bandwidth channel of the guaranteed bandwidth channels, and then (iii) to travel from the private transport network to the second data terminal via the second ISP network.

2. The data transport system of claim 1, wherein the first data terminal is connected to the first ISP network via a local network, such that the latency-sensitive data will travel from the first data terminal to the first ISP network via the local network.

3. The data transport system of claim 1, wherein the private transport network comprises a plurality of transport relays having respective IP addresses, and wherein the first data terminal is configured to address the latency-sensitive data to an IP address of one transport relay of the plurality of transport relays in the private transport network.

4. The data transport system of claim 1, wherein the private transport network comprises a plurality of transport relays, and wherein the first data terminal is configured to address the latency-sensitive data to a transport relay, of the plurality of transport relays in the private transport network, that is closest to the second data terminal.

5. The data transport system of claim 1, wherein the private transport network comprises a plurality of transport relays, and wherein the first data terminal is configured to address the latency-sensitive data to a transport relay, of the plurality of transport relays in the private transport network, that is closest to the first data terminal.

6. The data transport system of claim 1, wherein the first data terminal is configured to use tunnelling to send the latency-sensitive data to the transport relay in the private transport network.

7. The data transport system of claim 1, wherein the first data terminal is configured to use a proxy mechanism to send the latency-sensitive data to the transport relay in the private transport network.

8. The data transport system of claim 1, wherein the second data terminal is connected to the second ISP network via a local network, such that the latency-sensitive data will travel from the second ISP network to the second data terminal via the local network.

9. The data transport system of claim 1, wherein the private transport network is configured to hold the latency-sensitive data for as long as necessary to forward the latency-sensitive data to a point of presence, of the multiple points of presence in the private transport network, that is nearest to the second data terminal.

10. The data transport system of claim 1, wherein the private transport network comprises a plurality of transport relays, wherein the plurality of transport relays comprise unicast-multicast reflectors, and wherein the private transport network supports multicast for enabling multi-party conferences.

11. A method of transporting data utilizing a data transport system, wherein the data transport system comprises:
a first Internet Service Provider (ISP) network;
a second ISP network;
a private transport network, comprising multiple points of presence, connected by guaranteed bandwidth channels, wherein the private transport network is configured for transporting data between the first ISP network and the second ISP network;
a transport relay in the private transport network;
a control server configured to provide admission control to the private transport network by preventing unauthorized parties from accessing the private transport network;
a first data terminal, connected to the first ISP network; and
a second data terminal, connected to the second ISP network, the method comprising:
the first data terminal sending authorization information to the control server in order to gain admission to the private transport network; and
the first data terminal sending latency-sensitive data to the second data terminal by addressing the latency-sensitive data to the transport relay in the private transport network, to cause the latency-sensitive data (i) to travel from the first data terminal to the private transport network via the first ISP network, and then (ii) to travel through the private transport network, via the transport relay, over a guaranteed bandwidth channel of the guaranteed bandwidth channels, and then (iii) to travel from the private transport network to the second data terminal via the second ISP network.

12. The method of claim 11, wherein the first data terminal is connected to the first ISP network via a local network, and wherein the latency-sensitive data travels from the first data terminal to the first ISP network via the local network.

13. The method of claim 11, wherein the second data terminal is connected to the second ISP network via a local network, and wherein the latency-sensitive data travels from the second ISP network to the second data terminal via the local network.

14. The method of claim 11, comprising the private transport network forwarding the latency-sensitive data to a point of presence, of the multiple points of presence in the private transport network, that is nearest to the second data terminal, and holding the latency-sensitive data in the private transport network for as long as necessary to carry out said forwarding.

15. The method of claim 11, wherein the private transport network comprises a plurality of transport relays, and wherein the first data terminal addresses the latency-sensitive data to a transport relay, of the plurality of transport relays in the private transport network, that is closest to the first data terminal.

16. The method of claim 11, wherein the private transport network comprises a plurality of transport relays, and wherein the first data terminal addresses the latency-sensitive data to a transport relay, of the plurality of transport relays in the private transport network, that is closest to the second data terminal.

17. The method of claim 11, wherein the private transport network comprises a plurality of transport relays, and wherein the plurality of transport relays comprise unicast-multicast reflectors, the method further comprising using multicast in the private transport network to send the latency-sensitive data to multiple recipients.

18. The method of claim 11, comprising the first data terminal addressing the latency-sensitive data to an IP address of the transport relay.

19. The method of claim 11, comprising the first data terminal using tunneling to send the latency-sensitive data to the transport relay in the private transport network.

20. The method of claim 11, comprising the first data terminal using a proxy mechanism to send the latency-sensitive data to the private transport relay in the transport network.

* * * * *